US010907225B2

(12) United States Patent
Steele et al.

(10) Patent No.: US 10,907,225 B2
(45) Date of Patent: Feb. 2, 2021

(54) BINDING PROCESS FOR PYROPHORIC STEELMAKING BYPRODUCTS

(71) Applicant: JC STEELE & SONS, INC., Statesville, NC (US)

(72) Inventors: Charles M. Steele, Statesville, NC (US); Richard B. Steele, Mooresville, NC (US); James F. Falter, Statesville, NC (US); Zane T. Voss, Pittsburgh, PA (US)

(73) Assignee: JC Steele & Sons, Inc., Statesville, NC (US)

( * ) Notice: Subject to any disclaimer, the term of this patent is extended or adjusted under 35 U.S.C. 154(b) by 178 days.

(21) Appl. No.: 15/899,881

(22) Filed: Feb. 20, 2018

(65) Prior Publication Data

US 2018/0237870 A1     Aug. 23, 2018

Related U.S. Application Data

(60) Provisional application No. 62/460,506, filed on Feb. 17, 2017.

(51) Int. Cl.
| | |
|---|---|
| *C21C 7/00* | (2006.01) |
| *C22B 1/248* | (2006.01) |
| *C21B 13/00* | (2006.01) |
| *C08L 95/00* | (2006.01) |
| *C08K 3/08* | (2006.01) |
| *C08K 3/22* | (2006.01) |
| *C08K 3/04* | (2006.01) |
| *C08K 3/34* | (2006.01) |
| *C08K 3/30* | (2006.01) |
| *C08K 3/14* | (2006.01) |
| *C08K 3/11* | (2018.01) |
| *C22B 1/244* | (2006.01) |

(52) U.S. Cl.
CPC .............. *C21C 7/0006* (2013.01); *C08K 3/04* (2013.01); *C08K 3/08* (2013.01); *C08K 3/11* (2018.01); *C08K 3/14* (2013.01); *C08K 3/22* (2013.01); *C08K 3/30* (2013.01); *C08K 3/34* (2013.01); *C08L 95/00* (2013.01); *C21B 13/008* (2013.01); *C21B 13/0046* (2013.01); *C21B 13/0066* (2013.01); *C21B 13/0093* (2013.01); *C22B 1/244* (2013.01); *C22B 1/248* (2013.01); *C08F 2500/08* (2013.01); *C08K 2003/0856* (2013.01); *C08K 2003/2206* (2013.01); *C08K 2003/3009* (2013.01); *C08L 2555/34* (2013.01); *C08L 2555/50* (2013.01); *C08L 2555/52* (2013.01); *C08L 2555/54* (2013.01)

(58) Field of Classification Search
None
See application file for complete search history.

(56) References Cited

U.S. PATENT DOCUMENTS

| | | | |
|---|---|---|---|
| 4,119,455 A | 10/1978 | Cass et al. | |
| 5,554,207 A * | 9/1996 | Bogdan | C21B 5/026 75/500 |
| 2006/0032327 A1* | 2/2006 | Huege | C21C 7/076 75/10.57 |
| 2011/0209582 A1* | 9/2011 | Zakosek | C22B 1/242 75/772 |

* cited by examiner

*Primary Examiner* — Christopher M Rodd
(74) *Attorney, Agent, or Firm* — Alston & Bird LLP

(57) ABSTRACT

Stabilized volatile briquettes and processes and apparatuses for making and using the same are provided. The stabilized volatile briquette includes a volatile material and a thermoplastic binder material such that the thermoplastic binder material binds the volatile material together to define a briquette that is stable. The process includes mixing a volatile waste material and a thermoplastic binder material to form a briquette mixture, shearing the briquette mixture, extruding the briquette mixture to form a thermoplastic briquette extrusion, and hardening the thermoplastic briquette extrusion to form a stabilized volatile briquette. The apparatus includes an extruder, a heating portion operably connected to the extruder, and a heated die operably connected to the heating portion such that the extruder, the heating portion, and the heated die are configured to gradually heat a thermoplastic binder material such that the thermoplastic binder material binds a provided volatile material together.

15 Claims, 10 Drawing Sheets

US 10,907,225 B2

BINDING PROCESS FOR PYROPHORIC STEELMAKING BYPRODUCTS

CROSS-REFERENCE TO RELATED APPLICATION

This application claims priority to U.S. Patent Application No. 62/460,506 filed Feb. 17, 2017, which is incorporated by reference herein in its entirety.

FIELD

The presently-disclosed invention relates generally to apparatuses and processes for binding volatile (e.g., pyrophoric) materials in steelmaking, and more particularly to apparatuses and processes for preparing briquettes containing volatile materials and binder materials.

BACKGROUND

Dust collectors in metallurgical making operations, such as in the making of iron and steel, collect large quantities of particulate matter which can be generally categorized as flue dust. Most of this material is discarded as waste. However, much of it contains valuable material that can be profitably recycled in metallurgical processes. Much of it is collected in the form of dry granules or dust from cyclones or bag houses. This dry material is typically recycled by pelletizing or briquetting.

Such dry materials include direct reduced iron ("DRI"). Steel made using DRI requires significantly less fuel than other methods because a traditional blast furnace is not needed. Instead, DRI is typically made into steel using an electric arc furnace to utilize the heat produced by the DRI. DRI is formed into briquettes for ease of shipping, handling, and storage. However, because DRI is pyrophoric, when the DRI briquettes are placed in large mounds for shipping, the DRI briquettes get very hot and can catch fire. As such, shipping the DRI briquettes can be difficult, dangerous, and expensive.

Current approaches to solve this problem involve agglomerating DRI with hydraulic cement or molasses in the briquettes to prevent combustion. However, using hydraulic cement or molasses also inherently requires the addition of water, which can cause dry DRI to rust and be less valuable because the iron is oxidized. In addition, this corrosion of DRI can also increase the risk of catching fire.

Accordingly, there still exists a need for systems and processes for rendering DRI briquettes safe for shipping and handling.

BRIEF SUMMARY

One or more embodiments of the invention may address one or more of the aforementioned problems. Certain embodiments according to the invention provide briquettes containing volatile materials that are safe for transport. In particular, embodiments of the invention are directed to stabilized volatile briquettes. The stabilized volatile briquette includes a volatile material and a thermoplastic binder material such that the thermoplastic binder material binds the volatile material together to define a briquette that is stable.

In another aspect, certain embodiments according to the invention provide processes for providing stable waste volatile materials as an energy source. The process includes mixing a volatile waste material and a thermoplastic binder material to form a briquette mixture, shearing the briquette mixture, extruding the briquette mixture to form a thermoplastic briquette extrusion, and hardening the thermoplastic briquette extrusion to form a stabilized volatile briquette.

In yet another aspect, certain embodiments according to the invention provide apparatuses for preparing stabilized volatile briquettes. The apparatus includes an extruder, a heating portion operably connected to the extruder, and a heated die operably connected to the heating portion. The extruder, the heating portion, and the heated die are configured to gradually heat a thermoplastic binder material such that the thermoplastic binder material binds a provided volatile material together.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings, in which some, but not all embodiments of the inventions are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

The invention includes, according to certain embodiments, briquettes containing volatile materials that are safe for transport. In particular, embodiments of the invention are directed to stabilized volatile briquettes. In this regard, a thermoplastic binder material binds the volatile material together to define briquettes that are stable (e.g., non-pyrophoric).

Figure 1:
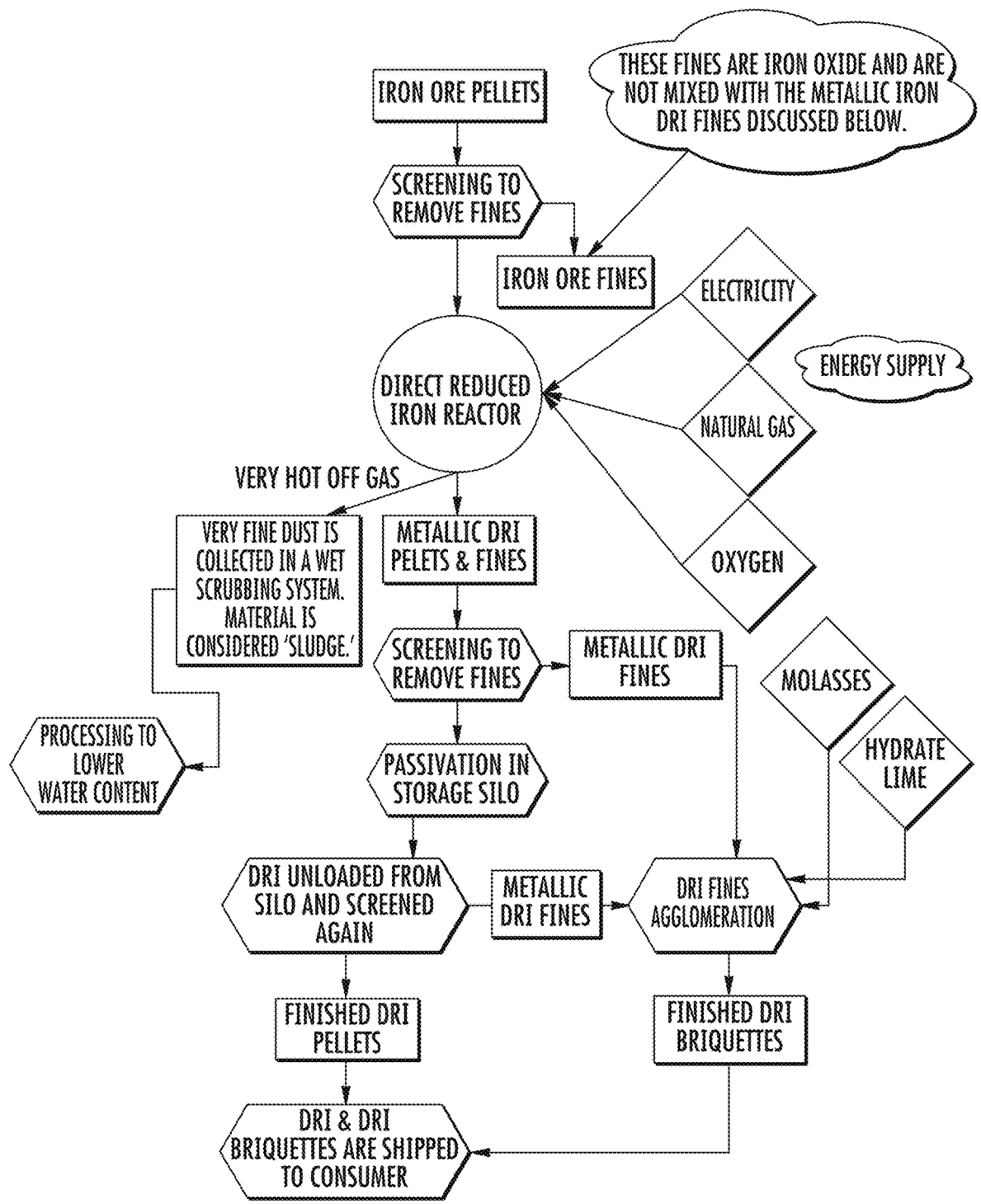
FIG. 1 is a block diagram of a prior art process for forming direct reduced iron briquettes.
Figure 3A:
FIGS. 3A-3C illustrate prior art direct reduced iron briquettes formed in accordance with the prior art process illustrated in FIG. 1.
Figure 3B:
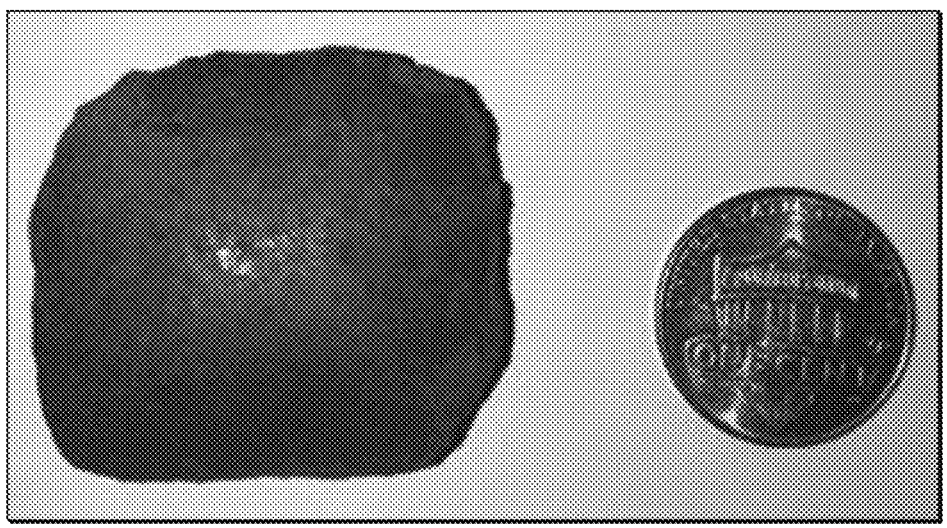
Figure 3C:
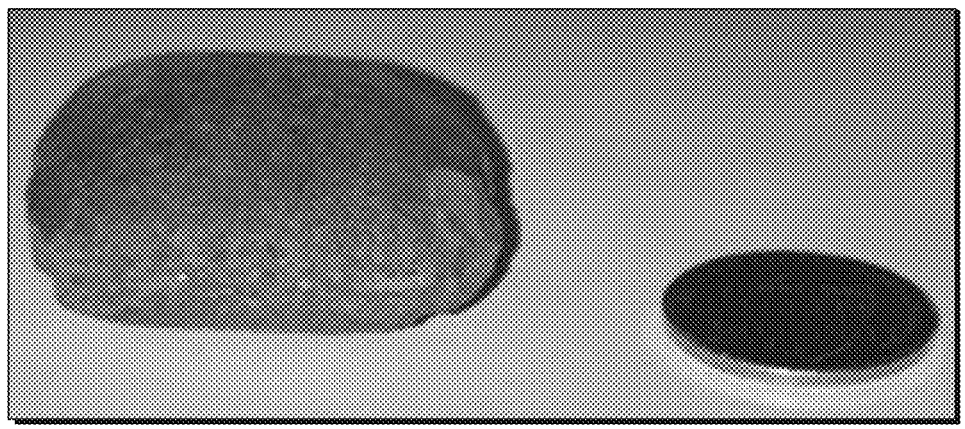

Prior art processes of forming DRI briquettes involve agglomerating DRI fines using, for instance, molasses and lime. FIG. 1, for example, is a block diagram of a prior art process for forming direct reduced iron briquettes. As shown in FIG. 1, iron ore pellets are first screened to remove fines. The iron ore pellets are then processed in a direct reduced iron reactor, which uses electricity, natural gas, and oxygen as energy sources. Very fine dust is collected from off-gasses from the direct reduced iron reactor via a scrubbing system and is then processed to lower the water content. Metallic DRI pellets and fines are collected from the direct reduced iron reactor, screened to remove DRI fines, further processed, and screened again to further remove DRI fines. The screened DRI fines are agglomerated with molasses and lime to form finished DRI briquettes, which are then shipped to consumers. FIGS. 3A-3C, for example, illustrate prior art DRI briquettes formed in accordance with the prior art process illustrated in FIG. 1.

Figure 2:
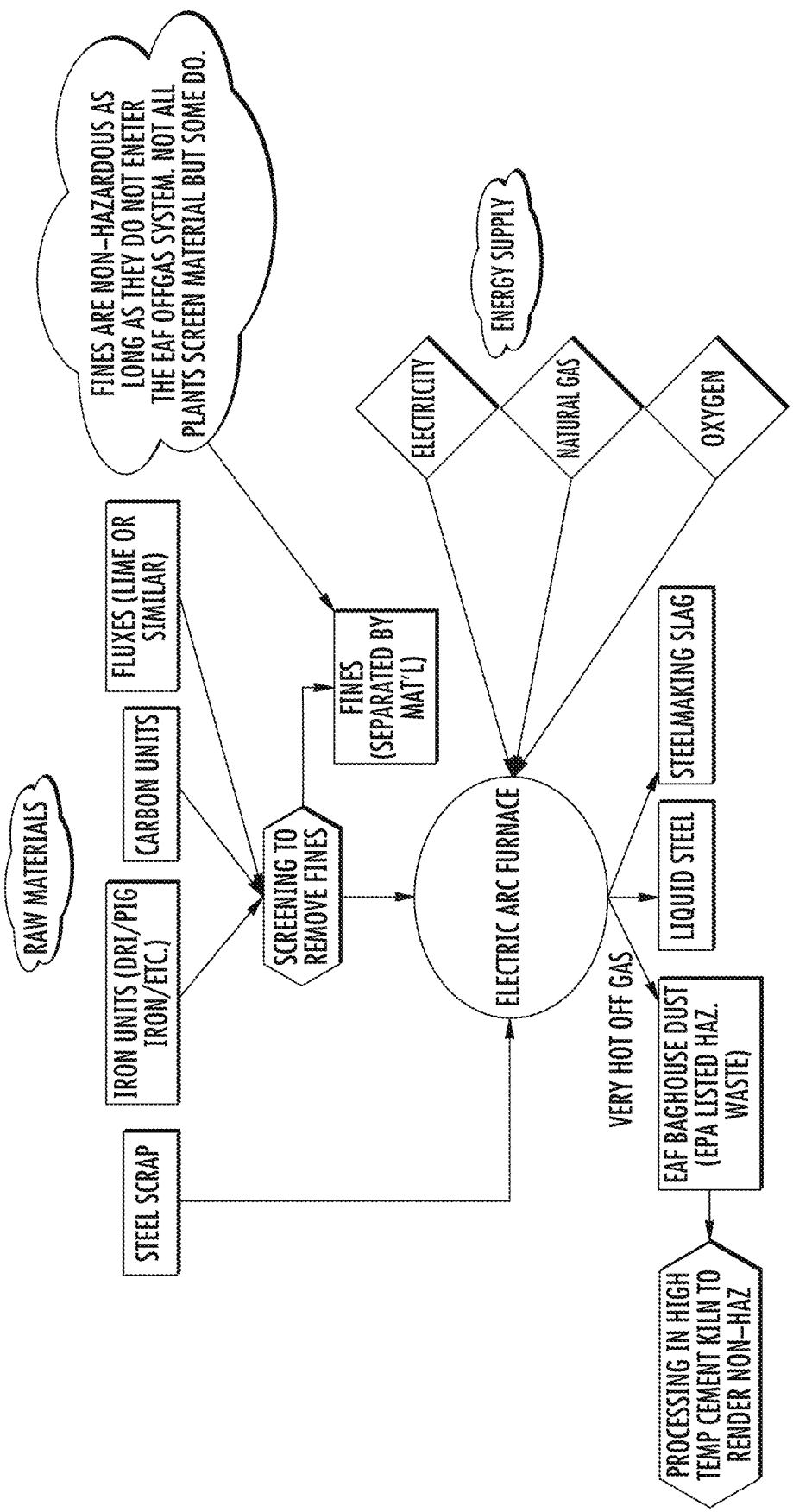
FIG. 2 is a block diagram of a prior art process for forming steel utilizing an electric arc furnace.

The prior art DRI briquettes are then used in the steelmaking process utilizing an electric arc furnace. FIG. 2, for example, is a block diagram of a prior art process for forming steel utilizing an electric arc furnace ("EAF"). As shown in FIG. 2, raw materials are added to an EAF along with electricity, natural gas, and oxygen as energy sources. The raw materials include steel scrap along with iron units (e.g., DRI, pig iron, etc.), carbon units, and fluxes (e.g., lime) that have been screened to remove fines. The EAF then produces liquid steel, steelmaking slag, and EAF baghouse dust (i.e. hazardous waste) in very hot off gas. The EAF baghouse dust may then be processed in high temperature cement kilns to render the dust non-hazardous.

I. Definitions

For the purposes of the present application, the term "polymer" shall generally include, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material, including isotactic, syndiotactic and random symmetries.

The term "low-melting", as used herein, may generally refer to any material having a melt temperature below 150° C.

The term "pyrophoric", as used herein, may generally refer to any material that is liable to ignite spontaneously on exposure to air. Pyrophoric materials may be water-reactive as well and may ignite spontaneously on exposure to moisture. Similarly, as used herein, the term "non-pyrophoric" may generally refer to a material that is not liable to ignite spontaneously on exposure to air and/or moisture.

The term "volatile", as used herein, may generally refer to any substance or material that is characterized by or prone to sharp or sudden changes or is unstable. For example, pyrophoric materials may be considered volatile because they are liable to ignite spontaneously on exposure to air and/or moisture.

The terms "stable" and "stabilized", as used herein, may generally refer to materials that are or have been made to become unlikely to change. For example, volatile materials may be stabilized, at least temporarily. Such stable or stabilized materials containing volatile waste materials may later become volatile yet again when exposed to certain conditions, as discussed in more detail herein.

II. Stabilized Volatile Briquettes

Figure 6A:
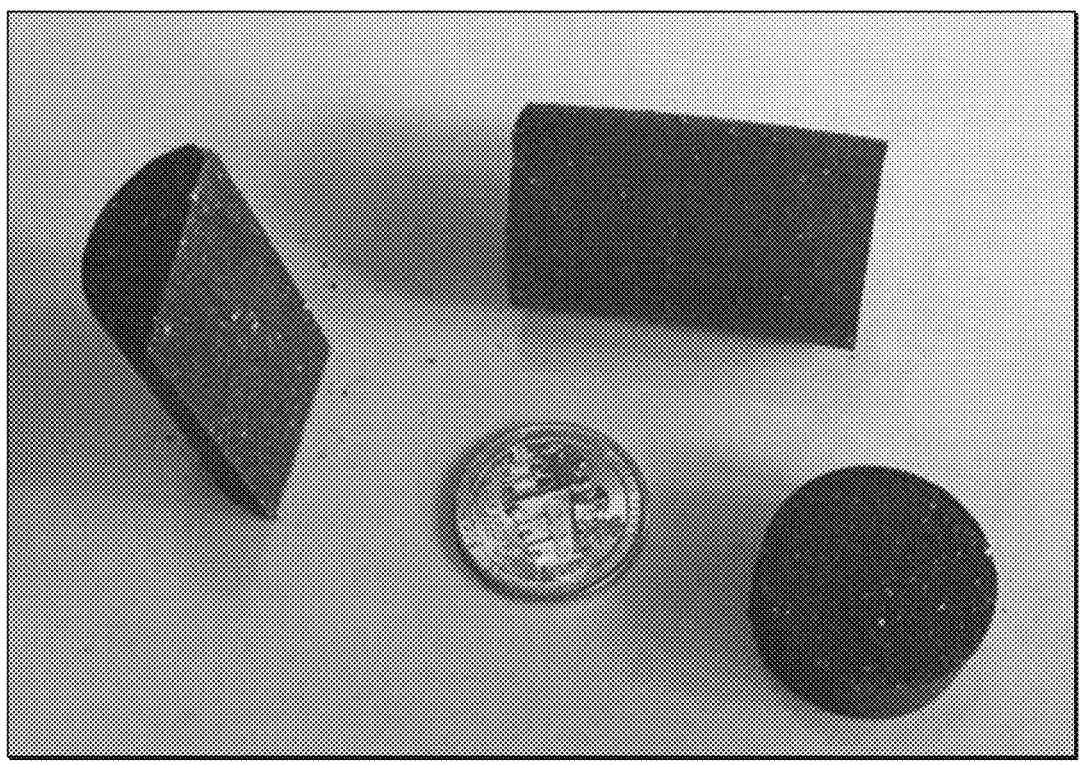
FIGS. 6A and 6B illustrate polymer-extruded direct reduced iron briquettes formed in accordance with the process illustrated in FIG. 4 in accordance with certain embodiments of the invention.
Figure 6B:
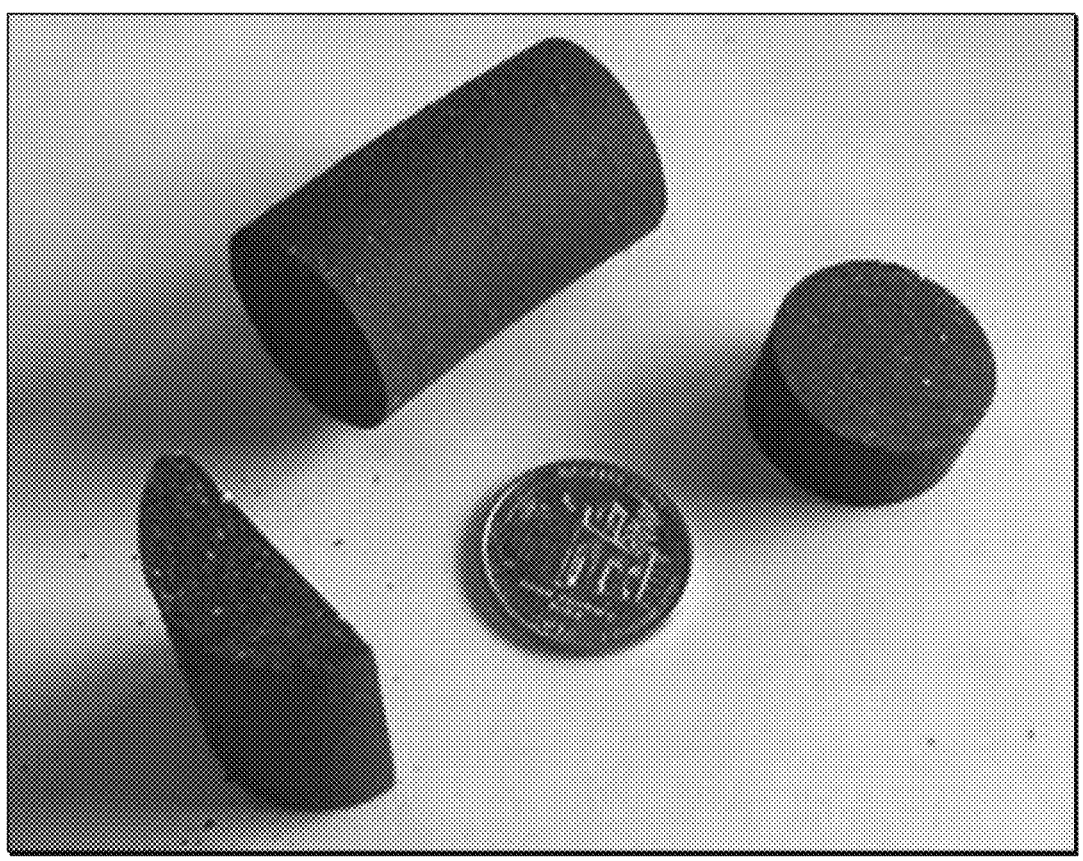

Certain embodiments according to the invention provide briquettes containing volatile materials that are safe for transport. In particular, embodiments of the invention are directed to stabilized volatile briquettes. A thermoplastic binder material binds the volatile material together to define briquettes that are stable (e.g., non-pyrophoric). In accordance with certain embodiments, the briquette may comprise one or more volatile materials and one or more binder materials. FIGS. 6A and 6B, for example, illustrate polymer-extruded direct reduced iron briquettes formed in accordance with certain embodiments of the invention.

According to certain embodiments, for instance, the one or more volatile materials may include at least one of DRI dust and/or fines, quick lime, anthracite, silicon manganese powder and/or fines, niobium carbide, roasted molybdenum sulphide, iron dust and/or chips, ferroalloy dust and/or chips, metallic DRI(C) fines (i.e. by-product fines), or any combination thereof. In other embodiments, for example, the one or more volatile materials may comprise any pyrophoric material. In certain embodiments, for instance, the briquette may comprise about 70% DRI dust. In some embodiments, for example, the DRI dust may have about 0.2% wet-based moisture ("WBM"). The term "wet-based moisture" (or "WBM"), as used herein, may generally refer to a surface phenomenon (e.g., adsorption) in contrast to a bulk phenomenon (e.g., absorption or chemical attachment). In this regard, WBM refers to humidity in the air that has condensed on the surface of the material. In further embodiments, for instance, the briquette may comprise about 15% quick lime. In certain embodiments, for example, the quick lime may have about 0.1% WBM. In some embodiments, for instance, the briquette may comprise about 5.0% anthracite. In further embodiments, for example, the anthracite may have about 0.1% WBM.

In certain embodiments, for instance, the one or more binder materials may comprise a polymer having a low melting point. For example, in some embodiments, the one or more polymers may be a low-melting thermoplastic polymer. For instance, in certain embodiments, the one or more polymers may be a low-melting thermoplastic with a high melt flow index. In further embodiments, for instance, the one or more polymers may comprise a low-melting polyolefin. For example, in some embodiments, the one or more polymers may comprise a low density polyethylene ("LDPE") (e.g., Microthene® G from LyondellBasell). In certain embodiments, for instance, the briquette may comprise about 10.0% polymer. In some embodiments, for example, the polymer may have about 0.1% WBM. In this regard, there are chemical benefits to having the one or polymers (i.e. a carbon source) in close contact with iron oxides when reintroduced into a furnace because the release (i.e. burning) of the carbon will pull oxygen molecules off of the iron oxide, thereby leaving the user with iron.

In other embodiments, for instance, the briquette may comprise asphalt (e.g., Axeon PG-70-22 from Axeon Specialty Products) as a binder material either in place of, or in addition to, the one or more polymers. In such embodiments, the briquette may also include an asphalt enhancer such as, for example, a wax (e.g., Sasobit® wax). In some embodiments, for example, the briquette may comprise about 15% asphalt. In certain embodiments, for instance, the briquette may comprise 12.6% asphalt. In some embodiments, for example, the asphalt may have approximately 0% WBM. In further embodiments, for instance, the briquette may comprise about 0.4% asphalt enhancer. In some embodiments, for example, the asphalt enhancer may have approximately 0% WBM. Depending on the volatile materials being agglomerated, the amount of binder material (i.e. polymer or asphalt) may be increased or decreased. Moreover, the amount of binder material may be adjusted based on ultimate downstream processes.

In this regard, the thermoplastic binder binds the volatile materials together to define the stabilized volatile briquette.

III. Process for Providing Stable Waste Volatile Materials as an Energy Source In another aspect, certain embodiments according to the invention provide processes for providing stable waste DRI as an energy source. In accordance with certain embodiments, the process may include mixing a volatile waste material and a thermoplastic binder material to form a briquette mixture, shearing the briquette mixture, extruding the briquette mixture to form a thermoplastic briquette extrusion, hardening the thermoplastic briquette extrusion to form a stabilized volatile briquette, stockpiling the stabilized volatile briquettes, and burning the stabilized volatile briquettes as an energy source and to isolate iron contained therein. In this regard, the thermoplastic binder material binds the volatile waste material together to render the volatile waste material stable and/or non-pyrophoric for transport, but the volatile waste material may be released from the thermoplastic binder material when burned. In some embodiments, the process may be a continuous process.

Figure 4:
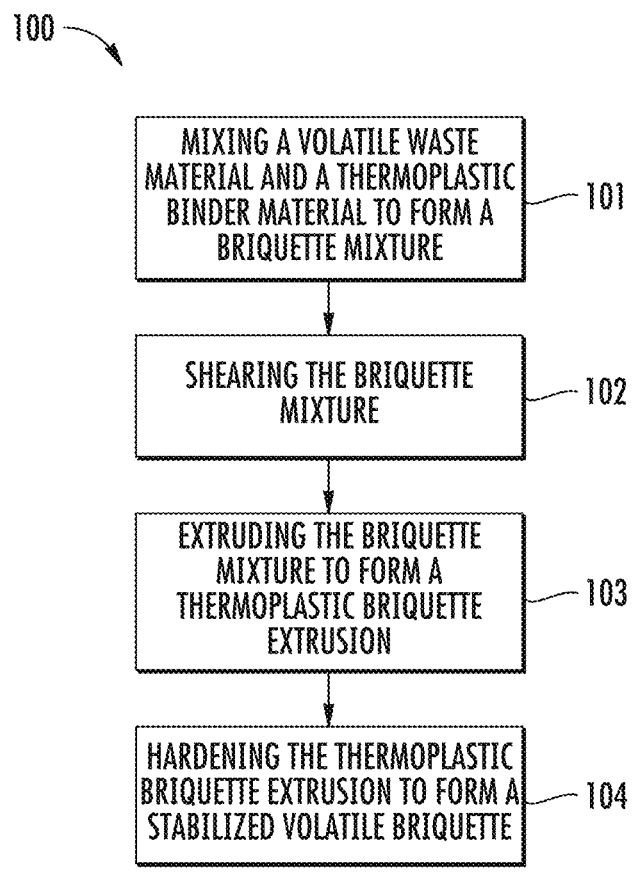
FIG. 4 is a block diagram of a process for providing stable waste volatile materials as an energy source in accordance with certain embodiments of the invention.

FIG. 4, for example, is a block diagram of a process for forming stabilized volatile briquettes in accordance with certain embodiments of the invention. As shown in FIG. 4, the process 100 includes mixing a volatile waste material and a thermoplastic binder material to form a briquette mixture at block 101, shearing the briquette mixture at block 102, extruding the briquette mixture to form a thermoplastic briquette extrusion at block 103, and hardening the thermoplastic briquette extrusion to form a stabilized volatile briquette at block 104. Further steps may include stockpiling the stabilized volatile briquette, and burning the stabilized volatile briquettes as part of the steelmaking process in a furnace, for example, an electric arc furnace, although any furnace known in the art to be used in steelmaking and/or burning DRI may be used. In this regard, there are chemical benefits to having the one or polymers (i.e. a carbon source) in close contact with iron oxides when reintroduced into a furnace because the release (i.e. burning) of the carbon will pull oxygen molecules off of the iron oxide, thereby leaving the user with iron. In addition, some of the materials contained in the stabilized volatile briquettes may be used as an energy source for the furnace.

During the extrusion step at block 103, the mixture should be pre-heated prior to introduction into the extruder. Moreover, heat may be introduced into an extruder (e.g., an upper extruder), in particular, heat may be added via heated barrels that contain the extrusion augers. Next, the briquette mixture may be further heated by a heating portion prior to being shaped by a heated die. In addition, the extrusion process may include de-airing of the pellet by exposing the mix to vacuum. As such, the gradual application of heat may slowly soften the binder material to coat and stick to the various volatile raw materials. In this regard, the heat may gradually bring the mix temperature up to a level that will then allow the final melting of the binder to occur at the heated die.

In this regard, the process causes the volatile material and the thermoplastic binder material to be extruded together into the briquettes such that the thermoplastic binder material binds the volatile material together to render the briquettes stable (e.g., non-pyrophoric).

IV. Apparatus for Preparing Stabilized Volatile Briquettes

Certain embodiments according to the invention provide an apparatus for preparing stabilized volatile briquettes. In accordance with certain embodiments, the apparatus may include an extruder, a heating portion, and a heated die.

Figure 5:
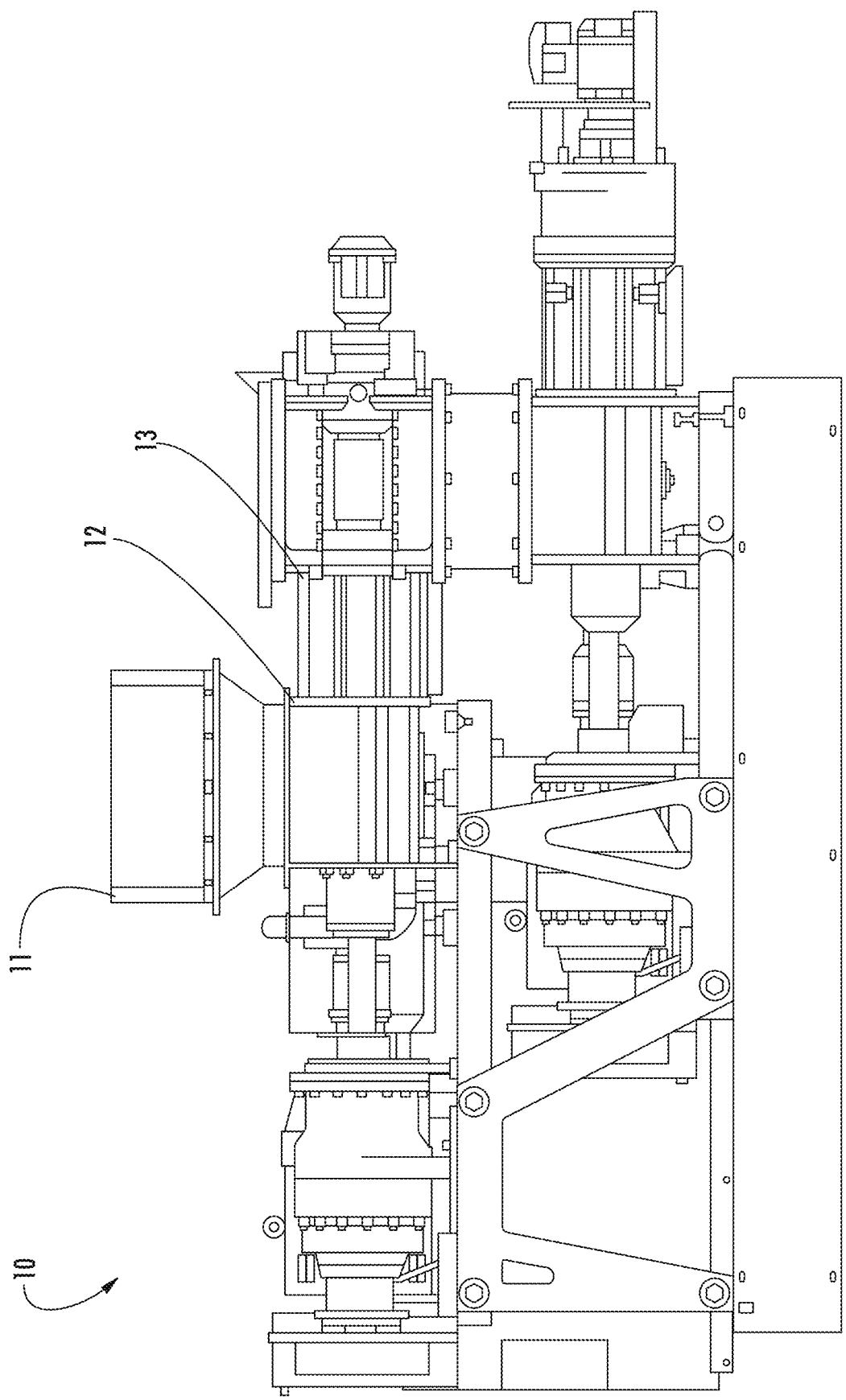
FIG. 5 is a schematic diagram of an apparatus for forming polymer-extruded briquettes in accordance with certain embodiments of the invention.

FIG. 5, for example, is a schematic diagram of an apparatus for preparing stabilized volatile briquettes in accordance with certain embodiments of the invention. As shown in FIG. 5, the system 10 includes an upper extruder 11, a heating portion 12, and a heated die 13. As such, the gradual application of heat may slowly soften the binder material to coat and stick to the various volatile raw materials. In this regard, the heat may gradually bring the mix temperature up to a level that will then allow the final melting of the binder to occur at the heated die.

Figure 7:
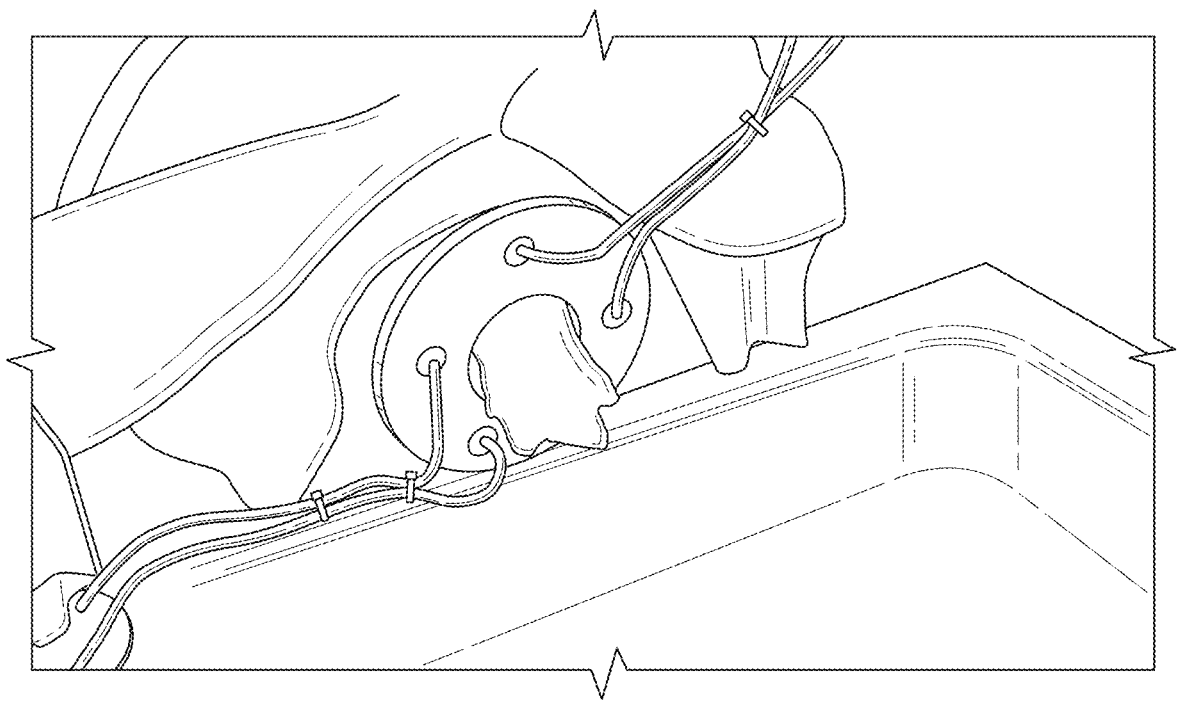
FIG. 7 illustrates an extruder used in the system illustrated in FIG. 5 in accordance with certain embodiments of the invention.
Figure 8:
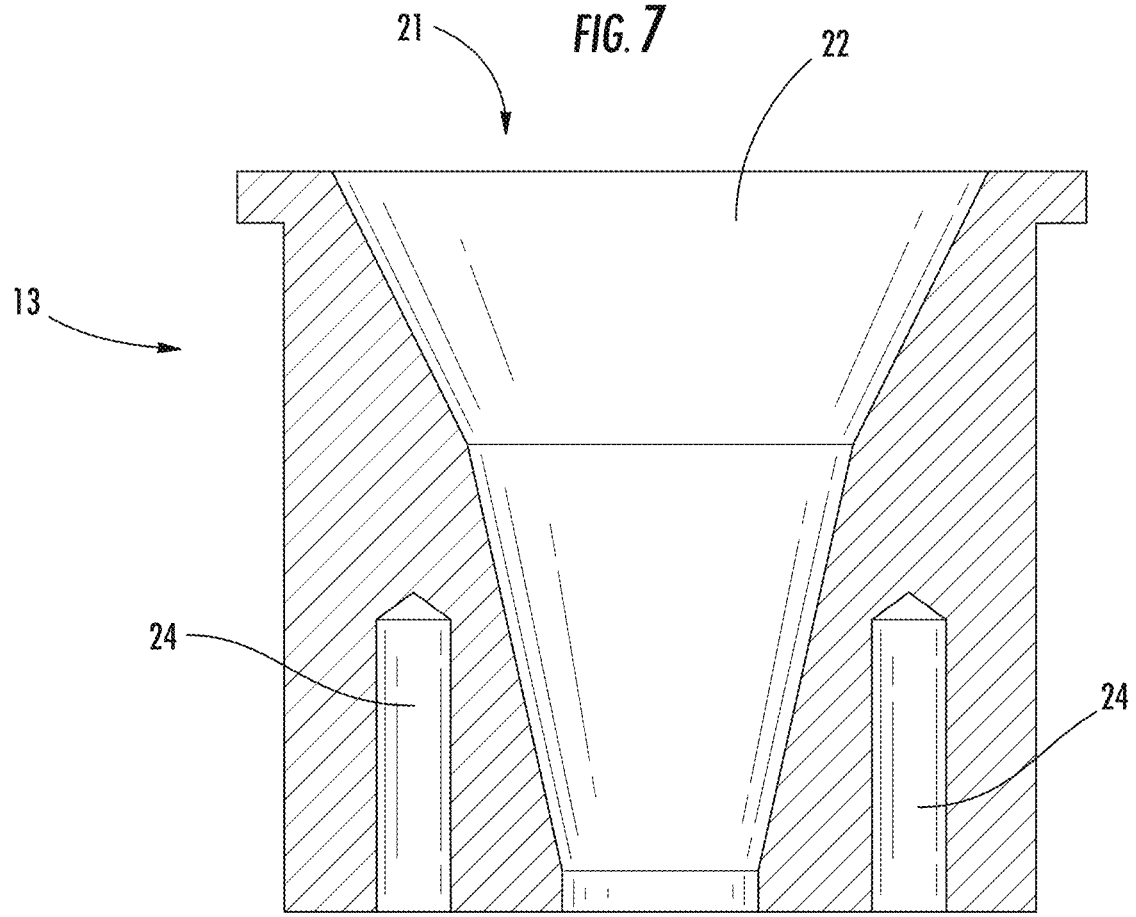
FIG. 8 illustrates a side view of a heated die of the system illustrated in FIG. 5 in accordance with certain embodiments of the invention.
Figure 9:
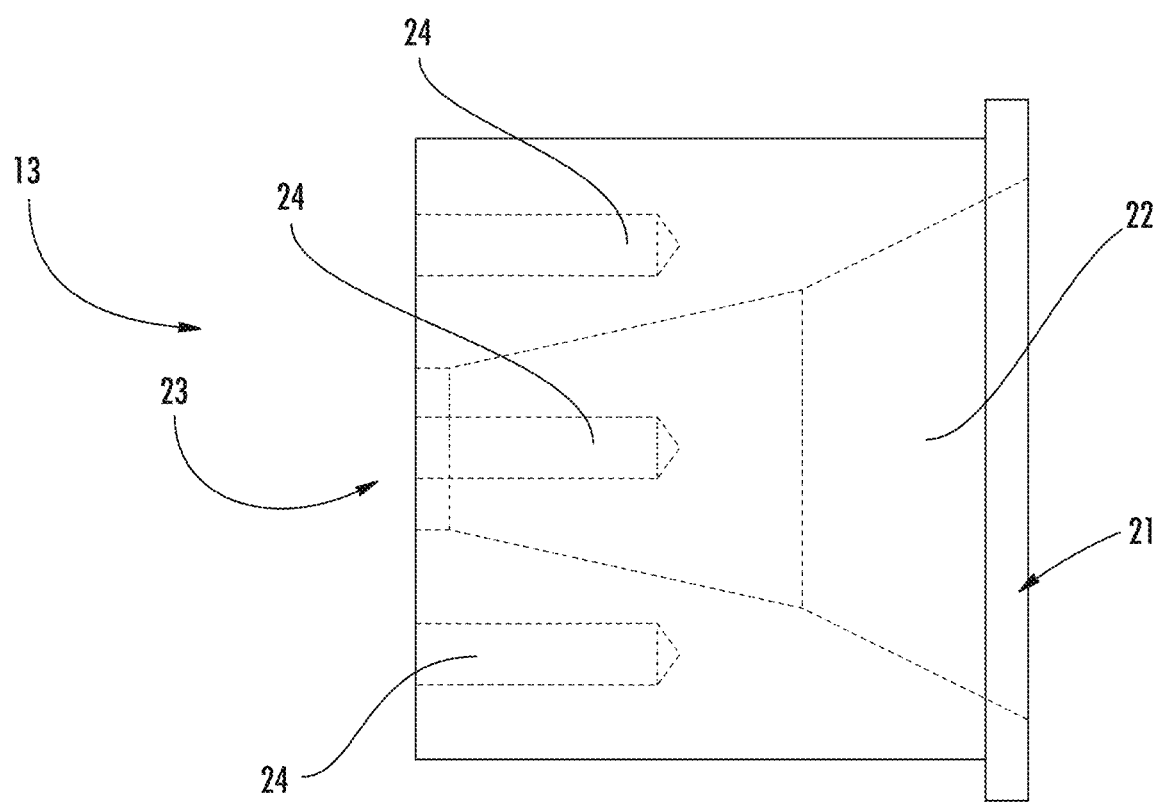
FIG. 9 is a schematic diagram of a side view of a heated die of the system illustrated in FIG. 5 in accordance with certain embodiments of the invention.
Figure 10:
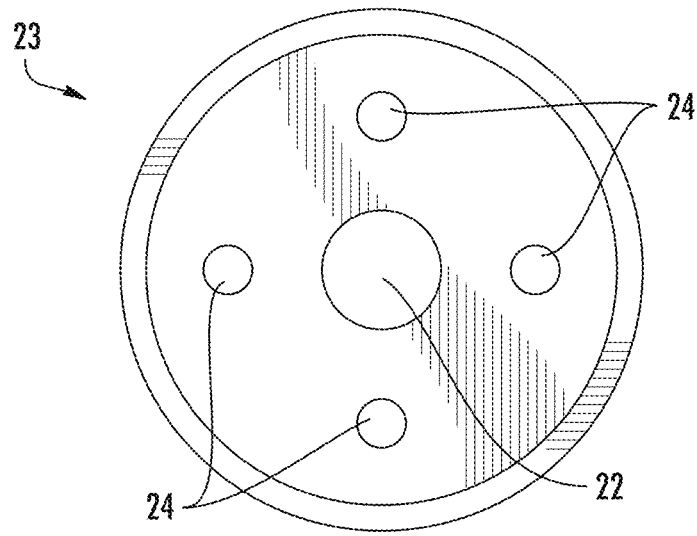
FIG. 10 illustrates a bottom view of a heated die of the system illustrated in FIG. 5 in accordance with certain embodiments of the invention.
Figure 11:
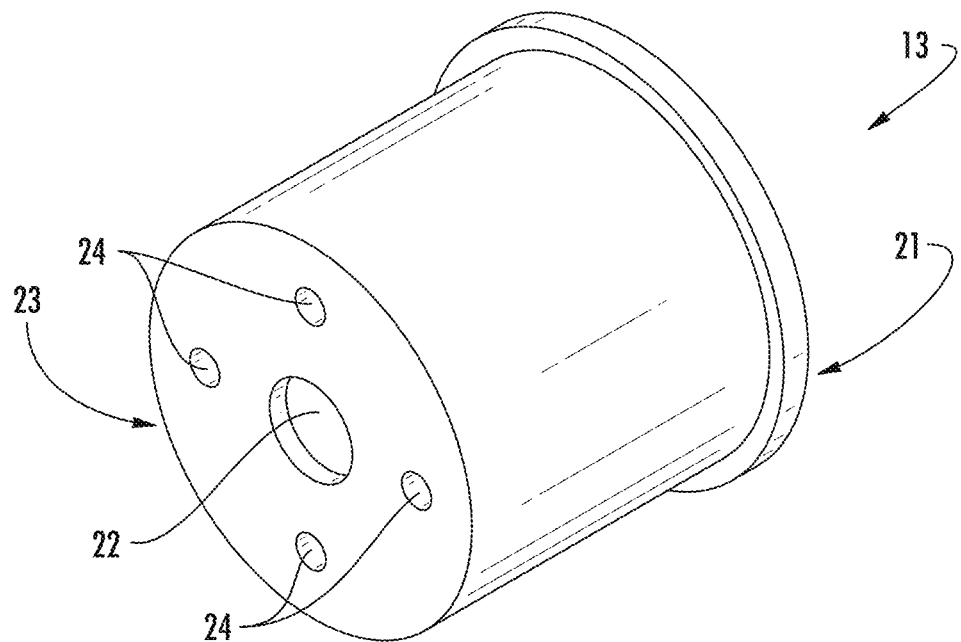
FIG. 11 illustrates a perspective view of a heated die of the system illustrated in FIG. 5 in accordance with certain embodiments of the invention.
Figure 12:
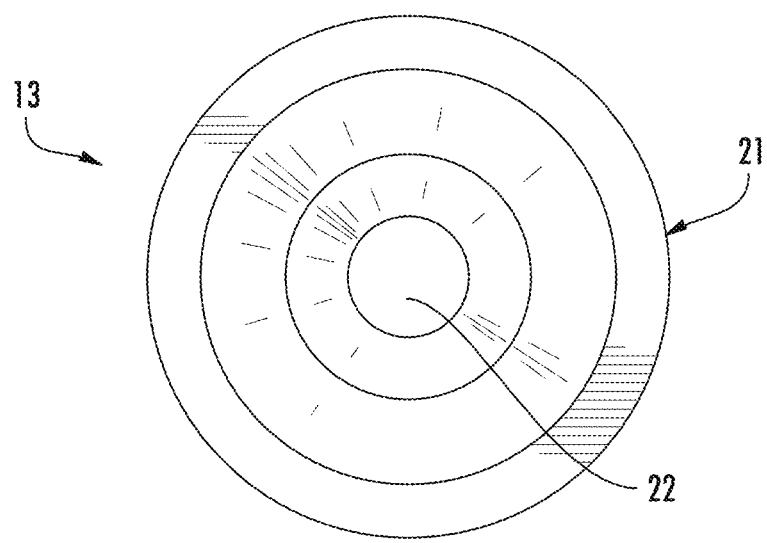
FIG. 12 illustrates a top view of a heated die of the system illustrated in FIG. 5 in accordance with certain embodiments of the invention.
Figure 13:
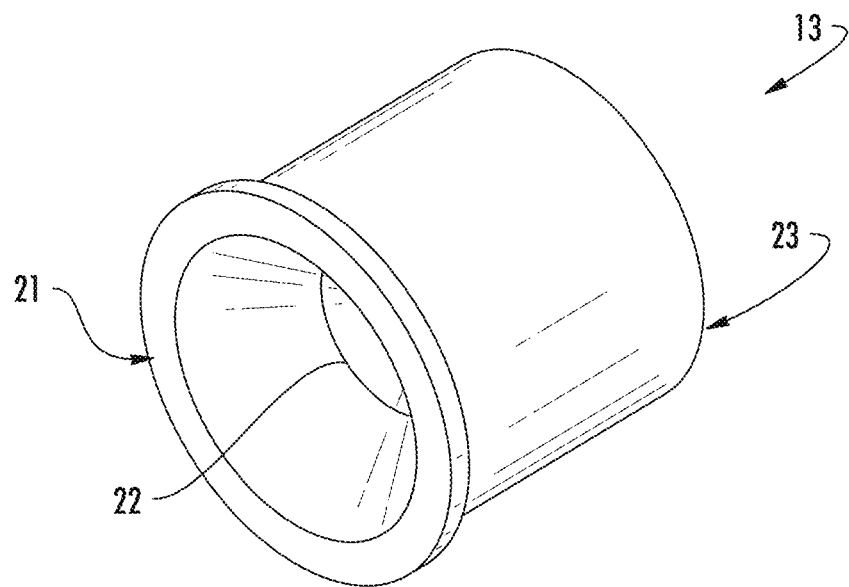
FIG. 13 illustrates a perspective view of a heated die of the system illustrated in FIG. 5 in accordance with certain embodiments of the invention.

FIG. 7, for instance, illustrates an extruder used in the system illustrated in FIG. 5 in accordance with certain embodiments of the invention. FIGS. 8-13 illustrate various views of a heated die of the system illustrated in FIG. 5 in accordance with certain embodiments of the invention. As shown in FIGS. 8-13, the heated die 13 includes a first end 21, a central cavity 22, and a second end 23. The central cavity 22 may be wider at the first end 21 and narrower at the second end 23. Moreover, the die of the extruder may include a plurality (e.g., at least one, at least two, at least three, at least four, etc.) of holes 24 beginning on the second end 23, surrounding the central cavity 22, and extending a portion of the way through the extruder 20. The holes 24 may be spaced evenly or unevenly around the central cavity 22 and are configured to receive the heaters of the extruder.

In this regard, the apparatus causes the volatile material and the thermoplastic binder material to be extruded together into the briquettes such that the thermoplastic binder material binds the volatile material together to render the briquettes stable (e.g., non-pyrophoric).

Non-Limiting Exemplary Embodiments

Having described various aspects and embodiments of the invention herein, further specific embodiments of the invention include those set forth in the following paragraphs.

Certain embodiments according to the invention provide briquettes containing volatile materials that are safe for transport. In particular, embodiments of the invention are directed to stabilized volatile briquettes. The stabilized volatile briquette includes a volatile material and a thermoplastic binder material such that the thermoplastic binder material binds the volatile material together to define a briquette that is stable.

In accordance with certain embodiments, for example, the volatile material may comprise at least one of direct reduced iron (DRI) dust, DRI fines, quick lime, anthracite, silicon manganese powder, silicon manganese fines, niobium carbide, roasted molybdenum sulphide, iron dust, iron chips, ferroalloy dust, ferroalloy chips, metallic DRI(C) fines, or any combination thereof. In further embodiments, for instance, the volatile material may comprise at least one of DRI dust, quick lime, anthracite, or any combination thereof.

According to certain embodiments, for example, the thermoplastic binder material may comprise at least one of a low-melting thermoplastic polymer, asphalt, or any combination thereof. In some embodiments, for instance, the thermoplastic binder material further may comprise an asphalt enhancer when the thermoplastic binder material comprises asphalt. In certain embodiments, for example, the thermoplastic binder material may comprise a low-melting polyolefin. In further embodiments, for instance, the thermoplastic binder material may comprise a low density polyethylene (LDPE).

In another aspect, certain embodiments according to the invention provide processes for providing stable waste volatile materials as an energy source. The process includes mixing a volatile waste material and a thermoplastic binder material to form a briquette mixture, shearing the briquette mixture, extruding the briquette mixture to form a thermoplastic briquette extrusion, and hardening the thermoplastic briquette extrusion to form a stabilized volatile briquette. In this regard, the thermoplastic binder material binds the volatile waste material together to define a briquette that is stable.

In accordance with certain embodiments, for example, the process may comprise a continuous process for forming a plurality of stabilized volatile briquettes. In some embodiments, for instance, the process may further comprise stockpiling the plurality of stabilized volatile briquettes, and burning the stabilized volatile briquettes during a steelmaking process. In such embodiments, for example, burning the stabilized volatile briquettes may release the volatile material from the thermoplastic binder material.

According to certain embodiments, for instance, the volatile material may comprise at least one of direct reduced iron (DRI) dust, DRI fines, quick lime, anthracite, silicon manganese powder, silicon manganese fines, niobium carbide, roasted molybdenum sulphide, iron dust, iron chips, ferroalloy dust, ferroalloy chips, metallic DRI(C) fines, or any combination thereof. In some embodiments, for example, the thermoplastic binder material may comprise at least one of a low-melting thermoplastic polymer, asphalt, or any combination thereof. In further embodiments, for instance, the process may further comprise providing an asphalt enhancer for mixing with the volatile material and the thermoplastic binder material when the thermoplastic binder material comprises asphalt.

In yet another aspect, certain embodiments according to the invention provide apparatuses for preparing stabilized volatile briquettes. The apparatus includes an extruder, a heating portion operably connected to the extruder, and a heated die operably connected to the heating portion. The extruder, the heating portion, and the heated die are configured to gradually heat a thermoplastic binder material such that the thermoplastic binder material binds a provided volatile material together.

In accordance with certain embodiments, for example, the heated die may include a first end, a second end, a central cavity extending through the heated die from the first end to the second end, and a plurality of holes beginning on the second end surrounding the central cavity and extending through a portion of the heated die. The central cavity may be wider at the first end than at the second end, and the plurality of holes may be configured to receive heaters. In some embodiments, for instance, the plurality of holes may be spaced evenly around the central cavity. In other embodiments, for example, the plurality of holes may be spaced unevenly around the central cavity.

According to certain embodiments, for instance, the volatile material may comprise at least one of direct reduced iron (DRI) dust, DRI fines, quick lime, anthracite, silicon manganese powder, silicon manganese fines, niobium carbide, roasted molybdenum sulphide, iron dust, iron chips, ferroalloy dust, ferroalloy chips, metallic DRI(C) fines, or any combination thereof. In some embodiments, for example, the thermoplastic binder material may comprise at least one of a low-melting thermoplastic polymer, asphalt, or any combination thereof. In further embodiments, for instance, the process may further comprise an asphalt enhancer when the thermoplastic binder material comprises asphalt.

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A stabilized volatile briquette, the briquette comprising:
   a volatile material comprising direct reduced iron (DRI); and
   a thermoplastic binder material,
   wherein the thermoplastic binder material binds the volatile material together to define a briquette that is stable.

2. The briquette according to claim 1, wherein the volatile material further comprises at least one of quick lime, anthracite, silicon manganese powder, silicon manganese fines, niobium carbide, roasted molybdenum sulphide, iron dust, iron chips, ferroalloy chips, metallic DRI(C) fines, or any combination thereof.

3. The briquette according to claim 1, wherein the volatile material further comprises at least one quick lime, anthracite, or any combination thereof.

4. The briquette according to claim 1, wherein the volatile material comprising direct reduced iron (DRI) is in the form of DRI dust and/or DRI fines.

5. The briquette according to claim 1, wherein the thermoplastic binder material comprises at least one of a low-melting thermoplastic polymer, asphalt, or any combination thereof.

6. The briquette according to claim 5, wherein the thermoplastic binder material further comprises an asphalt enhancer when thermoplastic binder material comprises asphalt.

7. The briquette according to claim 1, wherein the thermoplastic binder material comprises a low-melting polyolefin.

8. The briquette according to claim 1, wherein the thermoplastic binder material comprises a low density polyethylene (LDPE).

9. A process for providing stable volatile materials as an energy source, the process comprising:

mixing a volatile material and a thermoplastic binder material to form a briquette mixture, wherein the volatile material comprises direct reduced iron (DRI);

shearing the briquette mixture;

extruding the briquette mixture to form a thermoplastic briquette extrusion; and hardening the thermoplastic briquette extrusion to form a stabilized volatile briquette.

10. The process according to claim 9, wherein the process comprises a continuous process for forming a plurality of stabilized volatile briquettes.

11. The process according to claim 10, further comprising:

stockpiling the plurality of stabilized volatile briquettes; and burning the stabilized volatile briquettes during a steel-making process, wherein burning the stabilized volatile briquettes releases the volatile material from the thermoplastic binder material.

12. The process according to claim 9, wherein the volatile material further comprises at least one of quick lime, anthracite, silicon manganese powder, silicon manganese fines, niobium carbide, roasted molybdenum sulphide, iron dust, iron chips, ferroalloy chips, metallic DRI(C) fines, or any combination thereof.

13. The process according to claim 9, wherein the volatile material comprising direct reduced iron (DRI) is in the form of DRI dust and/or DRI fines.

14. The process according to claim 9, wherein the thermoplastic binder material comprises at least one of a low-melting thermoplastic polymer, asphalt, or any combination thereof.

15. The process according to claim 14, further comprising providing an asphalt enhancer for mixing with the volatile material and the thermoplastic binder material when the thermoplastic binder material comprises asphalt.

* * * * *